Figure 1:
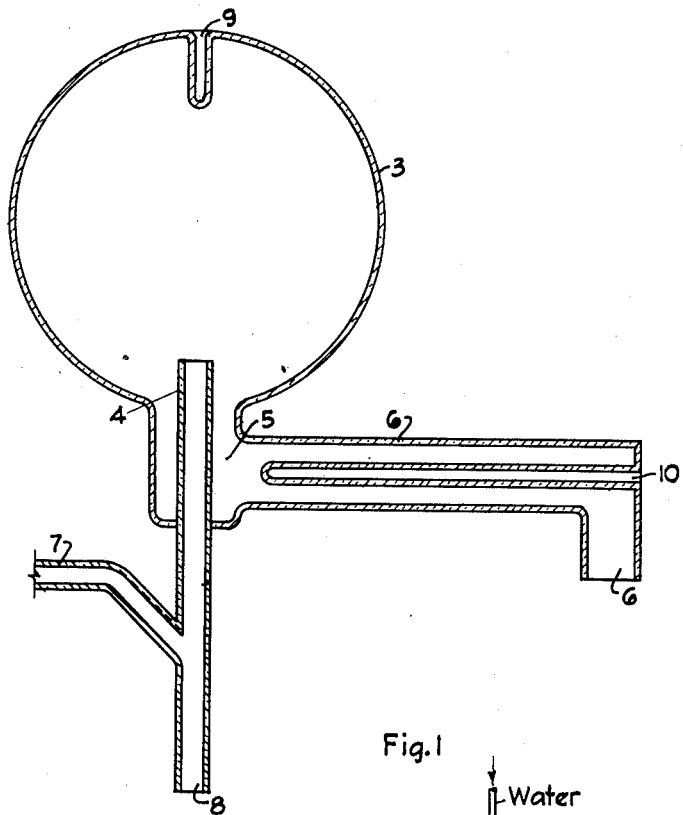

June 23, 1953     A. E. LACOMBLE ET AL     2,643,272

HALO-SUBSTITUTION OF ORGANIC COMPOUNDS

Filed Jan. 4, 1947

Inventor: Antoine E. Lacomblé
George W. Hearne
Donald S. LaFrance

By their Attorney: Robert G. Slick

Patented June 23, 1953

2,643,272

UNITED STATES PATENT OFFICE 2,643,272

HALO-SUBSTITUTION OF ORGANIC COMPOUNDS

Antoine E. Lacomble, San Francisco, George W. Hearne, El Cerrito, and Donald S. La France, Richmond, Calif., assignors to Shell Development Company, San Francisco, Calif., a corporation of Delaware Application January 4, 1947, Serial No. 720,270

3 Claims. (Cl. 260—694)

This invention relates to a novel process and reactor for conducting the halogenation of organic compounds via substitution. More specifically, this invention provides a novel reactor of spherical shape whereby it is possible to secure greater yields of the desired halogenated products.

The reactor of the present invention is applicable to a wide variety of halogenation reactions and is particularly applicable to the production of dichloropropenes.

When one attempts to chlorinate propene to produce dichloropropene, a portion of the chlorine attacks the molecule by addition while another portion reacts by substitution. That portion which reacts by addition, forms saturated 1,2-dichloropropane, while it is by substitution that the desired dichloropropene is formed.

It is an object of the present invention to provide a novel reactor wherein it is possible to chlorinate propene to produce a large yield of dichloropropene and a small yield of dichloropropane. A further object of the invention is to provide a reactor which has a large throughput for its size and which provides an efficient method of heating the entering reactants. A further object of the invention is to provide a reactor which is applicable to halogen substitution reactions in general and which may be used for reactions involving a large variety of starting materials. A further object is to provide a reactor which permits the use of a high ratio of halogen to organic starting material. Another object is to provide a reactor with a reflex action whereby the partially reacted products are commingled with fresh entering reactants whereby the formation of di- and polyhalogenated products is favored over the production of monohalogenated products. Other objects will be apparent from the specification.

The objects of the present invention are accomplished by providing a spherical reactor in which the reactants are introduced in a non-tangential relationship to the sphere in such manner that a turbulent flow of gases is produced which results in intimate mixing of the entering reactants with the hot reaction products. This results in the entering reactants being brought to the reaction temperature almost instantaneously.

In conducting halogen substitution reactions it is important that the reactants be brought to the reaction temperature quickly for the reason that at lower temperatures the reaction is primarily one of addition. Although the desirability of avoiding low temperature contact between the reactants has been previously recognized, it has been found impractical to heat the individual reactants to the desired temperature, say 500° C., and then mix them for the reason that the reaction is highly exothermic. If this were done the exothermic nature of the reaction would cause the temperature to rise much above optimum with resultant decomposition and carbon formation. Because of the exothermic nature of the reaction, the mixing temperature must be considerably decreased as the excess of organic material over halogen is decreased; when chlorine and propene are to be reacted at 500° C. the reactants must be mixed at about room temperature. It has been observed, with reactors used in the past, that more dichloropropane is formed as the ratio of propene to chlorine is decreased, presumably because of a greater opportunity to react at low temperatures. This is unfortunate since a low ratio of propylene to chlorine would otherwise be highly desirable inasmuch as such a ratio would favor the formation of the desired unsaturated dichlorides at the expense of unsaturated monochlorides. The present invention provides a process whereby high yields of the unsaturated dichlorides are obtained and in which the ratio of organic material to halogen may be kept quite low.

As is pointed out above, one of the primary objects of the invention is to provide a method of favoring substitution at the expense of addition in halogenation reactions. For this reason, the invention is of primary importance when applied to unsaturated organic compounds. A preferred group of organic compounds is constituted by those unsaturated hydrocarbons which may be vaporized without decomposition and includes those unsaturated hydrocarbons having up to about 16 carbon atoms. Suitable unsaturated hydrocarbons include; ethylene, propylene, butene-1, butene-2, isobutylene, pentene-1, 2-methylbutene-1, 3-methylbutene-1, hexene-1, heptene-1, octene-1, decene-2, tridecene-4, cyclopropene, cyclobutene, cyclopentene, cyclohexene, cyclooctene, acetylene, methyl acetylene, ethyl acetylene, dimethyl acetylene, pentyne-1, 3-methylbutyne-1, hexyne-3 and 3,3-dimethylbutyne-1. A particularly valuable class of starting materials is the unsaturated, halogenated hydrocarbons. Compounds such as allyl chloride, vinyl chloride, allyl bromide, 1-chlorobutene-3 and 1-bromopentene-4 are typical of the halogenated unsaturated hydrocarbons to which the invention may be applied.

Although, as is pointed out above, the invention is primarily directed to reactions wherein one wishes to favor substitution reactions over those of addition, the invention may be nevertheless applied to saturated hydrocarbons where no such problem exists, since it provides a convenient and economical way of heating the reactants to the reaction temperature. Suitable saturated hydrocarbons include methane, ethane, propane, n-butane isobutane, n-hexane, n-heptane, 2-methylhexane, n-octane, iso-octane, n-nonane, n-decane, 2,4-dimethyl octane, n-dodecane, cyclopropane, cyclopentane, methylcyclopentane, and the like. The invention is also applicable to halogenated saturated hydrocarbons, compounds such as the following being suitable: dichloromethane, chloroethane, dibromopropane, 1,4-dichlorobutane, 1,5-dibromohexane, 1-chlorooctane and the like.

Although it is generally preferred to employ a single organic starting material, the invention is applicable to mixtures of any of the above compounds. For instance, the starting material may be a technical petroleum fraction containing a variety of organic materials. Such fractions which contain a large percentage of unsaturates, such as those fractions produced by cracking, catalytic dehydrogenation or the like, are particularly suitable.

The above compounds are given by way of example only, and the invention is not restricted to the compounds set forth.

Figure 2:
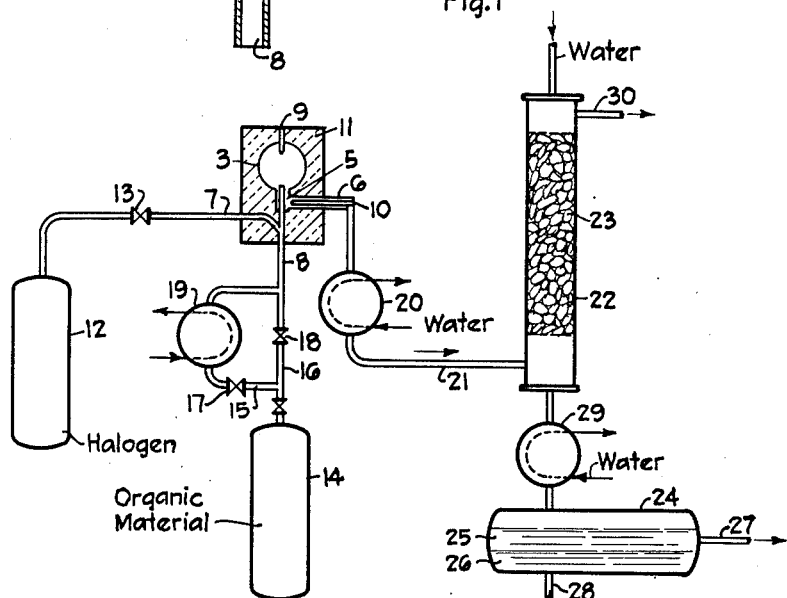

Referring now to the drawings, there is illustrated in cross-section in Figure 1 a reactor constituting a preferred embodiment of the present invention. Figure 2 illustrates the reactor of Figure 1 with the necessary accessory equipment for carrying out a halogen substitution reaction.

The reactor proper consists of a spherical vessel 3 of any suitable material such as pyrex glass. Mounted axially with respect to the sphere is an inlet for reactants 4. Preferably inlet 4 extends for a short distance into the sphere. Concentric to inlet 4 is an outlet arm 5, for the reacted materials. A tube 6 is provided for leading off the reacted materials. Inlet 4 serves as an entrance for a mixture of the halogen and the organic material. Preferably the entrance tube is of relatively small diameter so that the reactants must move into the reactor at a considerable velocity. Further, the point of mixture of the organic material and halogen should be located near the point where the reactants are discharged into the reactor. By observing these precautions, there is little opportunity for a reaction to occur at a low temperature outside the reactor and thus the likelihood of addition reactions is further lessened. Preferably the means for mixing reactants are constituted by two tubes 7 and 8 which converge to form a Y-shaped member in such a manner that one reactant is injected into the other in opposing relationship, thus insuring thorough intermingling of the reactants. Tubes 7 or 8 may be used to introduce either reactant, but it is preferred to introduce the organic material through tube 8 since the organic material is ordinarily introduced in larger volume. If a diluent is used it may be introduced through either tube. If a diluent is used which is not entirely inert to the reaction, e. g. a hydrogen halide, it should be introduced with the halogen to prevent the possibility of an unwanted reaction with the organic material. The reactor 3 may be equipped with suitable thermocouple wells to measure the temperature at various points. In the drawings, two wells 9 and 10 are illustrated. In order to assist in maintaining the desired temperature, the reactor may be enclosed in a heat insulating jacket 11, which may be made of any suitable material such as asbestos.

In operation, a halogen, such as chlorine, is introduced into tube 7 from a source 12, controlled by a valve 13. An organic material, such as propene is introduced into tube 8 from a source 14. Source 14 is coupled to tube 8 through two lines, 15 and 16 which are controlled by two valves 17 and 18, respectively. Line 15 is equipped with a heater 19 which serves to heat the organic material passing therethrough. Thus, one may pass heated or unheated organic material or a mixture thereof into tube 8 by the proper control of valves 17 and 18. The halogen from tube 7 and organic material from tube 8 are mixed and passed through inlet 4 into the reactor 3. The reactants are thoroughly mixed with hot reaction gases so that they are raised immediately to the reaction temperature. The reacted gases leave the reactor by means of arm 5 and tube 6 and are passed into a condenser 20 where substantially all of the halogenated hydrocarbon is condensed. Products from the condenser, which are now partially liquid and partially gaseous, are passed by means of line 21 to a scrubber 22 which is provided with a contact material 23, such as glass helices or saddles. Water introduced into the scrubber as illustrated dissolves the hydrogen halide from the gas phase and the liquid from the scrubber is conveyed to a cooler 29 and a phase separator 24, where two phases are formed: an upper aqueous phase 25 containing hydrogen halide and a lower phase 26 containing the halogenated hydrocarbon. These two phases may be drawn off by lines 27 and 28, respectively. The lower phase may be further treated by means well known to those skilled in the art such as fractionation and washing with water to purify the product. Any unreacted starting material is removed from the top of scrubber 22 by means of line 30.

Many variations are possible in the above apparatus, particularly in the reactor proper. For instance the inlet and outlet have been shown as concentric. Actually this exact arrangement is not necessary inasmuch as the important factor is turbulent flow which is achieved through the prevention of streamlining. Thus, the outlet and inlet could be located side by side or at right angles to each other. To avoid streamlining, it is important that the outlet and inlet not form tangents to the inside surface of the sphere.

Inasmuch as the reaction is highly exothermic, steps must be taken to keep the temperature down to the desired level. For instance, the temperature may be regulated by controlling the rate at which the reactants flow into the reactor or a diluent may be used to assist in temperature control or a combination of such methods may be used. The diluent may be one which is inert to the reaction such as a hydrogen halide or nitrogen, or one of the reactants (preferably the organic material) may be employed in excess which serves to dilute the mixture and carry off the heat of the reaction.

The following examples illustrate the method of operation.

*Example I*

A reactor and accessory equipment similar to that shown in the drawings was used. The reactor was of Pyrex glass and had a capacity of 200 cc. The feed consisted of propene and chlorine in a ratio of 1.7/1.0 by volume with a propene rate of 0.605 mole per minute. The feed gases were introduced at room temperature but the reactor was preheated to 300° C., by passing heated propene through it. The reaction products left the reactor at a temperature of 590° C.–600° C. The contact time was on the order of 0.2 second. The substitution was 104% as estimated by the hydrogen chloride evolved. The reaction products were fractionated to produce a fraction boiling in the range of 1,2-dichloropropane and dichloropropenes and this fraction was analyzed by chemical and physical means, including infra-red absorption spectrum analysis. This fraction was found to contain only 6.5% of 1,2-dichloropropane, the balance being substantially only unsaturated poly-chlorides.

*Example II*

Propene and chlorine were reacted in a tubular reactor in which the reactants entered one end of the tube and were discharged at the other. The ratio of propene to chlorine was 1.6/1.0 and the reactor was maintained at a temperature of 510° C. A fraction containing dichloropropane and dichloropropenes was fractionated from the product as in Example I. This fraction was found to contain 23% 1,2-dichloropropane.

Although this invention is not predicated on any theory of operation it is believed that its superior operation results from a novel combination of two principles. In the first place, the reactants are heated to reaction temperature so rapidly that the reactants pass through the temperature range conducive to addition reactions in too short a time for such reactions to take place to any substantial extent, thus this type of reactor is particularly useful for operating under adiabatic conditions. Secondly, the reactor tends to yield di- and polyhalogenated products for the apparent reason that any monohalogenated material is brought into contact with fresh entering halogen where it has another opportunity for reaction. For instance, it is believed when propene and chlorine are used as the starting material, that allyl chloride is initially formed. Due to the recycling action of the reactor the allyl chloride is mixed with the fresh entering chlorine to form a dichloropropene.

We claim as our invention:

1. In a process for substitutively reacting a halogen chosen from the group consisting of chlorine and bromine with a vaporizable organic compound wherein a feed mixture of the halogen and organic reactant is introduced in the vaporous state into a reaction chamber while simultaneously withdrawing a heated vaporous effluent composed of reactants and various product gases from said chamber, the step comprising admitting the vaporous feed mixture countercurrently to the gaseous effluent whereby the feed vapors are brought into immediate contact and commingle with the said effluent, said feed vapors thereby being rapidly heated by the effluent.

2. The process defined by claim 1 in which the vaporizable organic compound is propene.

3. The process defined by claim 1 in which the halogen is chlorine.

ANTOINE E. LACOMBLE.
GEORGE W. HEARNE.
DONALD S. LA FRANCE.

References Cited in the file of this patent

UNITED STATES PATENTS

| Number | Name | Date |
|---|---|---|
| 1,324,443 | Conover | Dec. 9, 1919 |
| 2,130,084 | Groll et al. | Sept. 13, 1938 |
| 2,369,117 | Carter | Feb. 13, 1945 |